United States Patent [19]

Igawa

[11] Patent Number: 5,151,032

[45] Date of Patent: Sep. 29, 1992

[54] MAGNETOPHORETIC DISPLAY PANEL

[75] Inventor: Tatsuya Igawa, Kanagawa, Japan

[73] Assignee: Kabushiki Kaisha Pilot, Tokyo, Japan

[21] Appl. No.: 551,345

[22] Filed: Jul. 12, 1990

[51] Int. Cl.⁵ .............................. B43L 1/00
[52] U.S. Cl. .................................... 434/409
[58] Field of Search .......... 434/309, 409; 346/74.3, 346/74.7; 428/309; 40/449; 446/132

[56] References Cited

U.S. PATENT DOCUMENTS

| | | | |
|---|---|---|---|
| 4,643,684 | 2/1987 | Murata | 434/409 |
| 4,804,327 | 2/1989 | Miller | 434/409 |
| 5,018,979 | 5/1991 | Gilano et al. | 434/409 |
| 5,057,363 | 10/1991 | Nakanishi | 434/409 |

Primary Examiner—Richard J. Apley
Assistant Examiner—Glenn E. Richman
Attorney, Agent, or Firm—Sughrue, Mion, Zinn, Macpeak & Seas

[57] ABSTRACT

A magnetophoretic display panel comprising a plurality of cells that are sandwiched between two substrates and each of which is filled with a liquid dispersion comprising magnetic particles, a dispersion medium, a colorant and, optionally, a thickener. The magnetic particles are such that:

(A) at least 90 wt. % of them have a particle size of 10-150 μm;
(B) they have an apparent density of 0.5-1.6 g/cm³; and
(C) they have a saturation magnetization of 40-150 emu/g.

20 Claims, 2 Drawing Sheets

MAGNETOPHORETIC DISPLAY PANEL

BACKGROUND OF THE INVENTION

This invention relates to a magnetophoretic display panel. Magnetophoretic display panels are known which comprise a plurality of cells sandwiched between two substrates and each of which is filled with a liquid dispersion that comprises magnetic particles, a dispersion medium, a colorant and, optionally, a thickener. When a magnetic pen is moved along the substrate on the front side, the magnetic particles are attracted by magnetic force of the pen and move from the substrate on the back side to produce a difference in contrast between the color of the liquid dispersion and that of the magnetic particles. This contrast is sufficient to create a display. Such is described in U.S. Pat. No. 4,143,472.

Such conventional magnetophoretic display panels have the problem that, depending on the type of magnetic particles, whiskers appear at the edge of the line of the image produced by movement of the magnetic pen. Thus, the line width becomes unseen along its length. This phenomenon is shown enlarged in FIG. 1. Element 2 is an image line having whiskers 1 at its edge. Element 4 is a cell held between the substrates. In contrast, FIG. 2 shows an image line 3 that has a uniform width in the absence of whiskers. This is the desired line configuration. In both FIGS. 1 and 2, the direction of movement of the magnetic pen is indicated by the arrow.

SUMMARY OF THE INVENTION

The present invention has been accomplished in order to solve the aforementioned problem of the prior art. An object, therefore, of the present invention is to provide a magnetophoretic display panel in which no whiskers will appear at the edge of the line of the image produced by movement of a magnetic pen to insure uniformity in the width of that line.

Another object of the present invention is to provide a magnetophoretic display panel that uses particular magnetic particles so that it will not be stained upon repeated display and erasure cycle.

These and other objects of the present invention are attained by a magnetophoretic display panel having a plurality of cells sandwiched between two substrates each of which filled with a liquid dispersion comprising magnetic particles, a dispersion medium, a colorant and, optionally, a thickener. The display panel uses magnetic particles in which:

(A) at least 90 wt % have a particle size of 10–150 μm;

(B) have an apparent density of 0.5–1.6 g/cm$^3$; and (C) have a saturation magnetization of 40–150 emu/g.

In a preferred embodiment, the magnetic particles are porous black iron oxide particles produced by reduction with hydrogen.

In another preferred embodiment, the magnetic particles are coated with a resin.

This invention will be described in detail by referring to the attached drawing and the detailed description that follows.

DETAILED DESCRIPTION OF THE INVENTION

Figure 1:
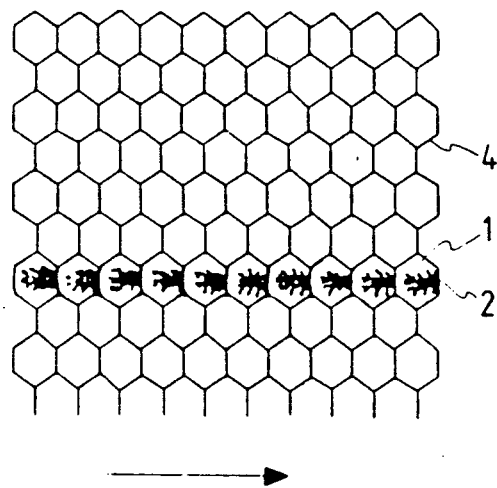
FIG. 1 is a sketch of a line image that has whiskers at the edge of the line as in the prior art.

As the result of the intensive studies conducted in order to investigate the reason why whiskers appeared at the edge of the image line to cause nonuniformity in its width when the magnetic pen was moved to produce a display in the conventional magnetophoretic display panels, the inventors discovered that when the magnetic particles has a large saturation magnetization per volume, they agglomerated to produce whiskers and that the same phenomenon would also occur when the size of the magnetic particles was large. The characteristic values of magnetic particles that are effective in preventing the occurrence of this phenomenon are no more than 150 emu/g in terms of saturation magnetization and no more than 150 μm in particle size.

Further, the magnetic particles used in the display panel of this invention have a high magnetic sensitivity so that they are magnetically attracted momentarily by a magnetic pen or an erasure magnet. This magnetic sensitivity is closely related to saturation magnetization and particle size. Magnetic particles having an unduly small saturation magnetization will not be magnetically attracted in an efficient manner and an appropriate saturation magnetization should not be lower than 40 emu/g. Unduly small magnetic particles are also difficult to be attracted magnetically. An appropriate particle size should not be less than 10 μm. Hence, the advantageous size of magnetic particles is within the range of 10–150 μm but there will be no substantial problem if at least 90 wt % of the magnetic particles used are within this range.

The magnetic particles should also have an apparent density of 0.5–1.6 g/cm$^3$. The magnetic particles having an apparent density in this range are so close in density to the liquid dispersion that they insure a stable display in the latter. If the magnetic particles have an apparent density greater than 1.6 g/cm$^3$, they are prone to settle in the liquid dispersion and the display cannot remain stable since it is particularly vulnerable to impact. If the apparent density is less than 0.5 g/cm$^3$, the magnetic particles will inevitably have an unduly small saturation magnetization and cannot be efficiently attracted by a magnetic pen or an erasure magnet.

As described above, the magnetic particles used in the present invention satisfy the following conditions:

(A) at least 90 wt % should have a particle size of 10–150 μm;

(B) have an apparent density of 0.5–1.6 g/cm$^3$; and (C) have a saturation magnetization of 40–150 emu/g.

The magnetic particles that can be used in the present invention include the following:

(1) porous black iron oxide ($Fe_3O_4$) particles produced by reduction with hydrogen;

(2) magnetic particles mixed with a resin and pulverized; and (3) magnetic particles the surfaces of which are coated with a resin.

The magnetic particles of groups (2) and (3) include those of ferrite, γ-hematite, γ-ferric oxide, barium ferrite, black iron oxide, etc. The magnetic particles of group (1) are porous, and those of groups (2) and (3) contain resins that have a density lower than conventional magnetic particles which will be described below. Thus, the magnetic particles of each of groups (1), (2) and (3) have the advantage in that they can be produced with apparent densities in the range of 0.5–1.6 g/cm$^3$.

In contrast, given particle sizes in substantially the same range, uncoated and nonporous magnetic particles produced by sintering magnetite particles have an apparent density of 2.0–3.0 g/cm$^3$. Uncoated and nonporous magnetic particles produced by sintering ferrite particles have an apparent density of 1.8–2.5 g/cm$^3$. Either type of magnetic particles have such a high density that they are incapable of maintaining a stable display in the liquid dispersion.

Another problem with the conventional magnetophoretic display panels is that they are gradually stained if used with the magnetic pen and erasing with the erasure magnet are repeated over time. As a result, the area of the panel which is subjected to more frequent display and erasure cycles than other areas is gradually stained and deteriorates the contrast that would otherwise be produced between the image area and the non-image area. This occurs as the magnetic particles suspensed in the liquid dispersion are repeatedly moved by magnetic force, they collide either with themselves, or with the particles of a colorant and other additives, or with the walls of substrates or cells sandwiched between the substrates. Consequently, the corners of the magnetic particles are deformed or their surfaces will wear to produce fine particles. These fine particles have little magnetic sensitivity and will instead be suspended uniformly in the liquid dispersions in cells. Thus, the display panel is stained in corresponding areas.

This stain problem can most effectively be prevented by magnetic particles of groups (1) and (3). The magnetic particles of group (2) are granulations (resin-bound particles) that are produced by mixing magnetic particles with a resin and pulverizing the mixture. The magnetic particles are often exposed on the cutting surfaces created by the pulverizing operation and such exposed magnetic particles can be the staring point of the deformation of corners and surface wear.

On the other hand, the magnetic particle of group (1) are produced by reducing with hydrogen the iron oxide particles that initially had a desired particle size. These particles are produced as follows. An iron sulfide ore ($FeS_2$) is roasted to obtain a porous iron oxide ($Fe_2O_3$) and the resulting porous iron oxide is reduced under a hydrogen atmosphere to obtain an iron tritetraoxide ($Fe_3O_4$). A suitable form of this material is made by Dowa Teppun Kogyo Kabushiki Kaisha. The thus obtained porous black iron tritetraoxide may be used as it is or after a treatment wherein it is mixed with resin binder solution and then the dried product is classified. Hence, despite their porous nature and low density, the magnetic particles of group (1) are highly resistant to corner deformation and surface wear. They effectively prevent staining of the display panel.

The magnetic particles of group (3) are also resistant to corner deformation and surface wear since the resin coat works as a cushion that effectively absorbs the impact exerted on the particles by collision with other objects. If the resin coat lacks integrity, the surface of magnetic particles will become exposed in some areas and no resistance to wear can be expected. From this viewpoint, multi-layered resin coating is effective since it provides further enhanced resistance to wear. As previously mentioned, the porous black iron oxide particles produced by reduction with hydrogen themselves are highly resistant to corner deformation and surface wear, so that resin coat to be formed on such magnetic particles need not composed of multiple layers.

A suitable coating resin may be selected from various thermoplastic and thermosetting resins including saturated polyester, unsaturated polyesters, styrene resins, (meth)acrylate resins, polyvinyl alcohol, polyvinyl butyral, epoxy resin, alkyd resins, urethane resins, cellulosic resins and modifications thereof. To form resin coats, magnetic particles may be mixed with solutions of such resins, with the mixture being dried by suitable means such as, fluidized-bed drying or spray drying. The resin coating may be single- or multi-layered. In the latter case, dissimilar resins may be used or a hard resin may be combined with a soft resin. The magnetic particles for use in display panels should not experience "blocking" in the liquid dispersion, so the coating resin is selected from among those which will not soften or swell in the liquid dispersion and may be partially cross-linked with a crosslinking agent such as a urethane modifying agent.

Dispersion media that can be used in the present invention may be polar systems such as water and glycol or non-polar systems such as organic solvents and oils.

In order to impart hiding power and color to the liquid dispersion, white pigments, other pigments and dyes may be sued as colorants in the present invention. The use of colorants may be omitted if a thickener having hiding power and color is to be used.

The thickener to be used optionally may be of any type known in the art as long as it imparts a yield value to the liquid dispersion. Suitable examples include fine particulate silicic acid or salts thereof, alumina, carbonates, barium sulfate, Benzidine Yellow, metal soaps, organic gelling agents, and surfactants.

Figure 2A:
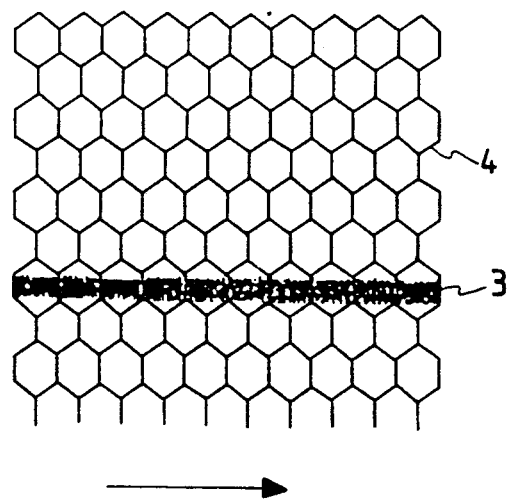
FIG. 2A is a sketch of a line image that has no whiskers and which hence has a uniform line width.
Figure 2B:
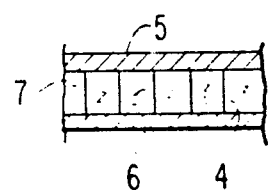
FIG. 2B is a cross-sectional view of the magnetic display panel of this invention.

FIG. 2B illustrates a cross-sectional view of a panel having substrates 5, 6 sandwiching the honeycomb 4. The liquid dispension 7 is held in the cells.

EXAMPLES

The present invention is described below in greater detail by means of the following examples.

EXAMPLE 1

Magnetic Particles

Porous black iron oxide particles having the following characteristic values were produced by reduction with hydrogen.
Particle size: 10–149 μm (for 93 wt % of the powder)
Apparent density: 0.86 g/cm$^3$
Saturation magnetization: 92 emu/g The particle size measurement was conducted in accordance with JIS H2601. The apparent density measurement was conducted in accordance with JIS Z2504. The saturation magnetization measurement was conducted with a dc magnetization automatic recorder Type 3257 of Yokogawa Electric Works, Ltd. The same methods and apparatus were used in Examples 2–4 and Comparative Examples 1, 3 to determine the measured characteristics.

| Liquid dispersion | |
| --- | --- |
| Isoparaffin solvent | 100 parts by weight |
| Titanium oxide | 1.0 part by weight |

-continued

| Liquid dispersion | |
|---|---|
| Nonionic surfactant | 0.1 part by weight |

These components were mixed with a homomixer to prepare a white mixture in liquid form. The previously prepared magnetic particles (9 g) were added to 103 parts by weight of this white mixture and gently stirred to prepare a uniform liquid dispersion.

Display Panel

Polyvinyl chloride honeycomb cells that had a length of 4 mm on each side and that were 1.3 mm high with a wall thickness of 0.04 mm were bonded to a polyvinyl chloride transparent substrate 0.3 mm thick by means of an ethylene/vinyl acetate emulsion adhesive. The previously prepared liquid dispersion was confined in each of the cells, which were thereafter bonded to a polyvinyl chloride transparent substrate 0.08 mm thick. By this technique magnetophoretic display panel was constructed.

EXAMPLE 2

One hundred parts by weight of the magnetic particles prepared in Example 1 were mixed with 200 parts by weight of a 10% polyvinyl butyral solution (in a 1:1 solvent system of ethanol and toluene) and 2 parts by weight of a 50% urethane prepolymer solution. The mixture was fluidized-bed dried to form a resin coat on each of the magnetic particles. The coated particles were then classified. The classified particles had the following characteristic values.
Particle size: 44–105 μm (for 95 wt % of the powder)
Apparent density: 1.05 g/cm³
Saturation magnetization: 61 emu/g.

Liquid dispersion

Aluminum stearate (1.0 part by weight) was added to the white mixture in liquid form that was prepared in Example 1. The ingredients were mixed with a homomixer to prepare 103 parts by weight of a white mixture in liquid form. To this mixture, 11 parts by weight of the previously prepared magnetic particles were added and stirred gently to prepare a uniform liquid dispersion.

Display panel

The liquid dispersion thus prepared was confined in cells between two polyvinyl chloride substrates as in Example 1 to construct a magnetophoretic display panel.

EXAMPLE 3

A ferrite powder (80 parts by weight) and 10% aqueous polyvinyl alcohol (400 parts by weight) were mixed, dried, pulverized and classified for the range of 44–105 μm to prepare magnetic particle shaving an apparent density of 1.5 g/cm³. One hundred parts by weight of these particles were mixed with 200 parts by weight of a 10% polyvinyl butyral solution (in a 1:1 solvent system of ethanol and toluene) and 2 parts by weight of a 50% urethane prepolymer solution. The mixture was fluidized-bed dried to form a resin coat on each of the magnetic particles. The coated particles were then classified. The classified particles had the following characteristic values.
Particle size: 44–105 μm (for 96 wt % of the powder)
Apparent density: 1.4 g/cm³
Saturation magnetization: 125 emu/g.

| Liquid dispersion | |
|---|---|
| Isoparaffin solvent | 100 parts by weight |
| Fine silicic acid powder | 1.5 parts by weight |
| Titanium oxide | 1.0 part by weight |
| Nonionic surfactant | 0.1 part by weight |

These components were mixed with a homomixer to prepare a white mixture in liquid form. The previously prepared magnetic particles (14 parts by weight) were added to 103 parts by weight of this white mixture and gently stirred to prepare a uniform liquid dispersion.

Display panel

The liquid dispersion thus prepared was confined in cells between two polyvinyl chloride substrates as in Example 1 to construct a magnetophoretic display panel.

EXAMPLE 4

Magnetic particles

Eighty parts by weight of the resin-coated magnetic particles prepared in Example 2, 40 parts by weight of a 50% vinyle acetate/acrylic emulsion and 20 parts by weight of water were mixed and spray-dried to form another resin coat on the magnetic particles. These magnetic particles with a dual resin coating were then classified. The classified particles had the following characteristic values.
Particle size: 44–105 μm (for 98 wt % of the powder)
Apparent density: 1.1 g/cm³
Saturation magnetization: 58 emu/g.

Liquid dispersion

To 103 parts by weight of the white mixture in liquid form that was prepared in Example 3, 11 parts by weight of the previously prepared magnetic particles were added and stirred gently to prepare a uniform liquid dispersion.

Display panel

The liquid dispersion thus prepared was confined in cells between two polyvinyl chloride substrates as in Example 1 to construct a magnetophoretic display panel.

COMPARATIVE EXAMPLES 1–3

Magnetic particles

| | Comp. Ex. 1 | Comp. Ex. 2 | Comp. Ex. 3 |
|---|---|---|---|
| Particle size, μm | <10 (12%) 10–105 (88%) | 44–74 (95%) | <44 (1%) 44–150 (84%) >150 (15%) |
| Apparent density, g/cm³ | 2.1 | 1.8 | 1.4 |
| Saturation magnetization, emu/g | 158 | 28 | 53 |
| Type of magnetic material | ferritic sinter | ferritic sinter | pulverized, resin-bound magnetite particles | where, "%" in the rows of "particle size" is on a weight basis.

Liquid dispersion

The white mixture in liquid form 103 parts by weight that was prepared in Example 2 was mixed with the previously prepared magnetic particles in amounts of 21, 18 and 14 part by weight, respectively, in Comparative Examples 1, 2 and 3. The ingredients were gently stirred to prepare uniform liquid dispersions.

Display panel

The liquid dispersions thus prepared were confined in cells between two polyvinyl chloride substrates as in Example 1 to construct display panels.

The display panels constructed in Examples 1-4 and Comparative Examples 1-3 were tested for their performance and the results are shown in the following table.

TABLE

| | Sharpness of displayed image | Staining following repeated displayed and erasure cycles |
|---|---|---|
| Example 1 | O | little staining after 4,500 display and erasure cycles |
| Example 2 | O | little staining after 6,000 cycles |
| Example 3 | O | little staining after 3,000 cycles |
| Example 4 | O | little staining after 10,000 cycles |
| Comparative Example 1 | X | clearly visible staining after 1,000 cycles |
| Comparative Example 2 | X | same as Comp. Ex. 1 |
| Comparative Example 3 | X | same as Comp. Ex. 1 |

The magnetic particles used in Comparative Example 1 contained those which were smaller than 10 $\mu$m, whereas the magnetic particles used in Comparative Example 2 had unduly small saturation magnetization. Thus, either type of magnetic particles had a low magnetic sensitivity and the panels as constructed had a pale gray color over the entire surface to produce only low contrast in display. Another defect of these panels was that the display became blurred upon impact.

The methods of testing conducted to obtain the data shown in the above table and the criteria for their evaluation are described below.

1. Sharpness of displayed image

Using a permanent magnet (2.5×2×3 mm in size; capable of magnetization for 3 mm) that was equivalent to MPB 380 of JIS C2502, an image was displayed at a recording speed of 25 cm/sec and the degree of uniformity in line width was checked. The results were evaluated by the following criteria:

O, minimum unevenness in line width;
X, whiskers at the edge of the line caused unevenness in its width.

2. Staining following repeated display and erasure cycles

Using a permanent magnet equivalent to MPB 380 of JIS C2502, an image was displayed at a recording speed of 25 cm/sec and thereafter erased by application of an adequate magnetic field. The degree of staining that occurred after repeated display and erasure cycles was examined visually.

As will be apparent from the foregoing description, the display panel of the present invention insures the formation of an image with uniform line width that has no whiskers developing at the edge of the line.

If porous black iron oxide particles produced by reduction with hydrogen or resin-coated magnetic particles are used, the display panel permits display and erasure cycles to be repeated many times without causing substantial staining of the panel.

It is apparent that modifications of the invention may be practiced without departing from the scope of the invention.

I claim:

1. A magnetophoretic display panel comprising; a pair of substrates, a plurality of cells sandwiched between said substrates, each of said cells filled with a liquid dispersion comprising magnetic particles, a dispersion medium, and a colorant;

at least 90 wt % of said magnetic particles have a particle size in the range of 10-150 $\mu$m;

said magnetic particles have an apparent density in the range of 0.5-1.6 g/cm$^3$; and said magnetic particles have a saturation magnetization in the range of 40-150 emu/g.

2. A magnetophoretic display panel according to claim 1 wherein said magnetic particles comprise porous black iron oxide particles produced by reduction with hydrogen.

3. A magnetophoretic display panel according to claim 1 wherein said magnetic particles are coated with a resin.

4. A magnetophoretic display panel according to claim 1, wherein said magnetic particles comprise a magnetic material mixed with a resin and pulverized.

5. A magnetophoretic display panel according to claim 1, wherein said magnetic material is selected from the group consisting of ferrite, $\gamma$-hematite, $\gamma$-ferrite oxide, barium ferrite and black iron oxide.

6. A magnetophoretic display panel according to claim 3, wherein said resin comprises a thermoplastic resin.

7. A magnetophoretic display panel according to claim 3, wherein said resin comprises a thermosetting resin.

8. A magnetophoretic display panel according to claim 3, wherein said coating is multi-layered.

9. A magnetophoretic display panel according to claim 8; wherein said multi-layered coating comprises a first resin coating and a second resin coating, and said first resin is different than said second resin.

10. A magnetophoretic display panel according to claim 1 further comprising a thickener.

11. A magnetophoretic display panel comprising; a pair of substrates, a plurality of cells between said substrates, each of said cells is filled with a liquid dispersion comprising magnetic particles, a dispersion medium, and a thickener, wherein, at least 90 wt % of said magnetic particles have a particle size in the range of 10-150 $\mu$m;

said magnetic particles have an apparent density in the range of 0.5-1.6 g/cm$^3$; and said magnetic particles have a saturation magnetization in the range of 40-150 emu/g.

12. A magnetophoretic display panel according to claim 11, wherein said magnetic particles comprise porous black iron oxide particles produced by reduction with hydrogen.

13. A magnetophoretic display panel according to claim 11 further comprising a colorant.

14. A magnetophoretic display panel according to claim 11, wherein said magnetic particles are coated with a resin.

15. A magnetophoretic display panel according to claim 14, wherein said magnetic particles comprise a magnetic material mixed with a resin and pulverized.

16. A magnetophoretic display panel according to claim 14, wherein said resin comprises a thermoplastic resin.

17. A magnetophoretic display panel according to claim 14, wherein said resin comprises a thermosetting resin.

18. A magnetophoretic display panel according to claim 14, wherein said coating is multi-layered.

19. A magnetophoretic display panel according to claim 14, wherein said multi-layered coating comprises a first resin coating and a second resin coating, and said first resin is different than said second resin.

20. A magnetophoretic display panel according to claim 11, wherein said magnetic material is selected from the group consisting of ferrite, γ-hematite, γ-ferrite oxide, barium ferrite and black iron oxide.

* * * * *